(12) United States Patent
Fares

(10) Patent No.: US 11,856,404 B2
(45) Date of Patent: Dec. 26, 2023

(54) SYSTEMS AND METHODS FOR ENHANCED REMOTE CONNECTIVITY PROVISIONING

(71) Applicant: CELITECH INC., Santa Clarita, CA (US)

(72) Inventor: Ahmad Fares, Santa Clarita, CA (US)

(73) Assignee: Celitech Inc., Santa Clarita, CA (US)

( * ) Notice: Subject to any disclaimer, the term of this patent is extended or adjusted under 35 U.S.C. 154(b) by 690 days.

(21) Appl. No.: 16/600,280

(22) Filed: Oct. 11, 2019

(65) Prior Publication Data

US 2020/0120494 A1  Apr. 16, 2020

Related U.S. Application Data

(60) Provisional application No. 62/745,882, filed on Oct. 15, 2018.

(51) Int. Cl.
| | | |
|---|---|---|
| *H04L 29/06* | (2006.01) | |
| *H04W 12/30* | (2021.01) | |
| *H04W 4/50* | (2018.01) | |
| *H04W 8/12* | (2009.01) | |
| *H04W 8/18* | (2009.01) | |
| *H04W 8/26* | (2009.01) | |
| *H04W 12/06* | (2021.01) | |

(52) U.S. Cl.
CPC ............ *H04W 12/35* (2021.01); *H04W 4/50* (2018.02); *H04W 8/12* (2013.01); *H04W 8/183* (2013.01); *H04W 8/26* (2013.01); *H04W 12/068* (2021.01)

(58) Field of Classification Search
CPC .......... H04W 12/35; H04W 4/50; H04W 8/26
See application file for complete search history.

(56) References Cited

U.S. PATENT DOCUMENTS

| | | | | |
|---|---|---|---|---|
| 2016/0005039 | A1* | 1/2016 | Taveau | H04L 9/3247 |
| | | | | 705/44 |
| 2016/0044496 | A1* | 2/2016 | Cormier | H04L 63/0823 |
| | | | | 455/558 |
| 2019/0109948 | A1* | 4/2019 | Yu | H04M 15/49 |

(Continued)

FOREIGN PATENT DOCUMENTS

| | | |
|---|---|---|
| EP | 2916590 A1 | 9/2015 |
| WO | 2017185255 A1 | 11/2017 |
| WO | 2018072852 A1 | 4/2018 |

OTHER PUBLICATIONS

European Search Report for EP 19203439.5 dated Nov. 27, 2019.

*Primary Examiner* — Wasika Nipa
(74) *Attorney, Agent, or Firm* — Bryan Cave Leighton Paisner LLP

(57) ABSTRACT

Systems and methods are provided for augmenting the services of SM-DP and SM-DP+ based mobile network systems. These systems and methods enable securing, in advance of arrival at the mobile network system, connectivity services (e.g., limited, short or one-time) or long-term subscription for eSIM/iSIM capable devices/machines. Such connectivity services may be purchased or booked in advance from a local or foreign network operator with service to be activated immediately or at a point in the future. For example, a traveler to a foreign country can pre-purchase (at the travel booking stage) mobile connectivity for use during upcoming travel to a foreign network. The corresponding service can be activated at the time/date of arrival for the selected period.

20 Claims, 14 Drawing Sheets

(56) References Cited

U.S. PATENT DOCUMENTS

2019/0238592 A1\* 8/2019 Qureshi ................. G06F 21/53
2019/0253563 A1\* 8/2019 Ullah .................. H04M 15/888
2020/0127881 A1\* 4/2020 Kempe ............... H04L 67/1008

\* cited by examiner

SYSTEMS AND METHODS FOR ENHANCED REMOTE CONNECTIVITY PROVISIONING

CROSS-REFERENCE TO RELATED APPLICATIONS

The present application claims the benefit of U.S. Patent Application No. 62/745,882, filed Oct. 15, 2018, the contents of which are hereby incorporated by reference in their entireties.

FIELD OF THE INVENTION

The present invention is directed to systems and methods for wireless/cellular/mobile communications. More specifically, the invention relates to Advanced Remote Subscriber Identity Module (SIM) provisioning, referred to herein as ("ARSP"), for providing improved mobile connectivity, particularly with respect to data services.

BACKGROUND OF THE INVENTION

Different devices (e.g., Internet of Things, IoT-related) are now capable of receiving Remote SIM Provisioning ("RSP"). Generally, a SIM is any type of secure element (e.g., removable SIM, embedded SIM, system on chip, etc.) on any type of device (e.g., smartphone, wearable, tablet, car, drone, appliance, etc.) that can request and/or accept remote connectivity provisioning to authenticate and activate a service (e.g., mobile data subscription) to a wireless/mobile network (e.g. 3G, EVDO, 4G/LTE, 5G, etc.). RSP enables subscribers and users of such devices to select and purchase connectivity services/packages (e.g., online), and configure and activate such services remotely (e.g., via secure provisioning and activation servers). RSP can be done without any human intervention or physical interaction (e.g., at brick-and-mortar/retail shop or other point of sale). FIG. 1A illustrates a prior-art SM-DP+-based architecture 100A suitable for providing RSP services to consumer devices using embedded SIM ("eSIM") capabilities, where a SIM is embedded into a device, or integrated SIM ("iSIM") capabilities where a SIM is integrated directly into a microprocessor of a device, such as in a Qualcomm Snapdragon 855. Such capabilities have been defined and standardized by the GSM Association ("GSMA"). The instant disclosure is equally applicable to both eSIM and iSIM technology; accordingly, eSIM and iSIM will be used interchangeably herein. More information on architectures, systems, and processes for providing RSP services can be found in GSMA's specifications, such as SGP.01 (v. 4.0), SGP.11 (v. 4.0), SGP.02 (v.4.0), SGP.05 (v.1.1), SGP.21 (v.2.2), SGP.22 (v. 2.2.1), SGP.23 (v.1.5), SGP.25 (v.1.0) which are incorporated by reference in their entireties herein.

The prior-art RSP SM-DP+-based architecture 100A includes a Mobile Network Operator 110A, a Subscription Manager Data Preparation+ server (SM-DP+) 120A, which is intended for consumer/end user devices 130A equipped with a secure element, such as embedded/integrated Universal Integrated Circuit Card ("eUICC"/"iUICC" 140A, which may also be known as an eSIM/iSIM) and operable by an end user 150A. RSP Subscription Manager Discovery Service (SM-DS) 160A is also illustrated.

Using such architectures, RSP is mainly provided by local/home mobile network operators (also called Mobile Network Operators ("MNOs")). In other words, a user can subscribe to and obtain local connectivity services that can be provisioned and provided by a locally available mobile network operator or "operator." To use RSP architecture 100 with eSIM/iSIM capable devices, the operator typically utilizes a Subscription Manager Data Preparation+ (SM-DP+) module (intended for consumer eSIMs and illustrated in FIG. 1A)—to securely provision and configure the eSIM devices that will consume the connectivity service.

Similar to FIG. 1A, FIG. 1B illustrates a prior-art SM-DP-based architecture 100B suitable for providing machine-to-machine ("M2M") RSP services to devices using a secure element, including UICC/eSIM/iSIM technology. The prior-art RSP SM-DP-based architecture 100B includes a Mobile Network Operator 110B, a Subscription Manager Data Preparation server (SM-DP) 190B, which is intended for devices equipped with a secure element (such as eUICC/eSIMs/iSIMs 140B). Subscription Manager Secure Routing (SM-SR) 180B is also illustrated.

FIG. 2 illustrates certain functional blocks of an exemplary SM-DP+ 120 of FIG. 1A. Functional blocks of such an SM-DP+, include: Profile Package Generation 210, Profile Package Protection 220, Profile Package Binding 230, Profile Package Storage 240, Profile Package Delivery 250, and SM-DS Event Registration 260.

Such an SM-DP+ (and similarly an SM-DP) may utilize resources and credentials associated with a mobile network operator (e.g. IMSI's, ICCID's, Authentication Keys, and/or Profile/Service descriptions) in order to generate and store "Protected Profiles." These "Protected Profiles" are used to identify subscribers to the network. "Protected Profiles" can be either generated by an SM-DP+ or by an operator/MNO. For example, a Mobile Virtual Network Operator ("MVNO") may request that an SM-DP+ generate a batch of secure profiles using a set of IMSIs allocated by an operator/MNO. In the case of an MNO, such profiles can be made ready (e.g. in batches) and shared with the SM-DP+ over an ES2+ interface.

Once available at the SM-DP+, "Protected Profiles" can be linked/bound and downloaded to a secure element contained on a device/machine that is requesting mobile services. An example of a compatible secure element may be one associated with/storing a unique identifier, one example is an embedded Universal Integrated Circuit Card ("eUICC"), such as eUICC 140A of FIG. 1A or eUICC 140B of FIG. 1B. The eUICC is identified by a globally unique eUICC Identity ("EID"). Once a "Protected Profile" is linked to a specific EID, it may be known as a "Bound Profile." This "Bound Profile" is intended for use only by the specific eUICC having the specific EID. Once the "Bound Profile" is downloaded to the eUICC, the collective may be known as an "eSIM." Once the profile is downloaded, the eSIM may enter either a disabled or enabled state. Typically, profile download also occurs along with activation of the eSIM (by the network/operator side) and starts usage accounting. Activation and usage accounting generally occurs even if the eSIM is turned off by the user of the device (e.g., end user 150A of FIG. 1A) or by the machine in the case of M2M applications.

In certain cases, the end user/subscriber of the device can utilize one or more Subscription Manager Discovery Services (e.g., SM-DS 160 of FIG. 1) to select from different connectivity subscriptions/packages offered by different local operators. These various local operators may be associated with a particular SM-DP+ as shown in FIG. 1A. Once the end user selects a subscription/package, an equivalent "Protected Profile" for the package is linked and downloaded to the secure element (e.g., UICC) by the associated SM-DP+, as described above.

It has been observed that the above described RSP architecture and protocol has the following general limitations:
1—Users are limited to selection of services from local networks to activate local subscriptions;
2—The user device already requires network connectivity (e.g., via Wi-Fi or other means of mobile connectivity) to be able to select and download a Bound Profile to activate an eSIM-based mobile subscription; otherwise the operator has to have a sophisticated provisioning system that allows restricted mobile internet access for users to pick and download a Bound Profile; and
3—Subscription usage accounting from the network/operator side typically starts at (or shortly after) the completion of the download of the eSIM. The user does not have the option to acquire a subscription profile that can be saved on the device and activated at some point in the future.

Today over 1 billion international travelers—not to mention machines—moving across borders and between different mobile networks/operators require connectivity with smart devices (e.g., smartphones, laptops, pads, wearable devices that are gradually adopting eSIM capabilities). The vast majority of such travelers (over 70%) turn off their mobile data roaming because it is expensive. The reason for this increased expense is that "roaming" typically involves paying three parties including the home, visited and transit networks.

At least because of the above RSP architecture and protocol, international travelers are finding it very difficult to learn about local connectivity services and offers (which are typically more affordable than roaming) in visited countries. For example, users cannot take advantage of the above RSP architecture and protocol until they are physically in the visited country and able to access the visited SM-DS/SM-DP+'s to buy packages/subscriptions and download the equivalent "Bound Profile" necessary for service provisioning. Accordingly, this makes travel (or cross-network trips) less connected and less efficient.

Indeed, due to these limitations, upon arrival at the out-of-network ("roaming") locale (e.g., foreign airport), the traveler may not have a service-enabled device to check local transport options like ride-sharing and/or have the use of other essential applications like mobile maps or messaging. Other inconveniences require the user to provide anew all user identification details (e.g., name, e-mail, etc.) and other information (e.g., credit card details) that were previously provided (e.g., to international travel/booking platforms during online flight booking and/or hotel booking). Not surprisingly, this makes the connectivity transaction, redundant, inconvenient, and inefficient for the user.

Based on at least the deficiencies defined above, there exists a need for travelers to acquire mobile data services prior to being in range of a particular mobile network. Moreover, there is a need for vendors (e.g., MVNOs) to provide improved short term data services associated with transient visitors (e.g., travelers) on their networks.

SUMMARY OF THE INVENTION

As will be discussed further herein, the limitations in the prior art can be overcome by providing systems and methods for improved management of Protected Profiles in accordance with the demands of short term service for visited mobile networks. Protected Profiles are a valuable network resource that are typically provisioned for traditional, long-term subscribers, which the novel systems and methods provided herein manipulate and adapt in accordance with the demands of short term service for visited mobile networks.

Accordingly, novel mobile network systems, architectures and processes are provided for provisioning mobile data services for one or more mobile devices that employ a secure element. Certain embodiments of these novel mobile network systems, architectures and processes maintain, at a subscription manager data preparation server a list of protected profiles, wherein the protected profiles are associated with one or more credentials of a mobile network operator of a mobile network. The mobile network systems, architectures and processes receive, at a subscription manager data preparation server when a secure element is outside a range of the mobile network, a data service request associated with the secure element, the data service request specifying a timeframe for when the secure element is expected to be within the range of the mobile network. The mobile network systems, architectures and processes identify, at a subscription manager data preparation server, an available protected profile in a maintained list of protected profiles using a timeframe specified in a received data service request. The mobile network systems, architectures and processes create, at a subscription manager data preparation server, a bound profile by associating an identified protected profile with a received data service request and a unique identifier associated with a secure element.

In certain embodiments, the mobile network systems, architectures and processes identify, at a subscription manager data preparation server, a second bound profile that is due for service by using a data service request associated with the second bound profile and activate service for the second bound profile due for service by communicating with the mobile network operator via the subscription manager data preparation server. In certain embodiments, the mobile network systems, architectures and processes identify, at a subscription manager data preparation server, a second bound profile with expired service by using a data service request associated with the second bound profile; de-activate service for the second bound profile with expired service by communicating with the mobile network operator via the subscription manager data preparation server; and de-associate, at the subscription manager data preparation server, the associated data service request and the second bound profile with expired service. In certain embodiments, the mobile network systems, architectures and processes notify a user of the second bound profile with expired service; and download an invalid subscriber identity module (SIM) profile to the secure element associated, via the unique identifier, with the second bound profile with expired service.

In certain embodiments of the mobile network systems, architectures and processes provided for provisioning mobile data services for one or more mobile devices that employ a secure element, the secure element is an embedded Universal Integrated Circuit Card or an integrated Universal Integrated Circuit Card. In certain embodiments of the mobile network systems, architectures and processes provided for provisioning mobile data services for one or more mobile devices that employ a secure element, the mobile network systems, architectures and process, include a subscription manager data preparation server that comprises a service provider server in communication with an SM-DP+ or SM-DP. In certain embodiments of the mobile network systems, architectures and processes provided for provisioning mobile data services for one or more mobile devices that employ a secure element, the mobile network systems, architectures and process, include a subscription manager data preparation server that comprises a service provider server that is is integrated into an SM-DP+ or SM-DP.

DESCRIPTION OF EMBODIMENTS OF THE INVENTION

Figure 1A:
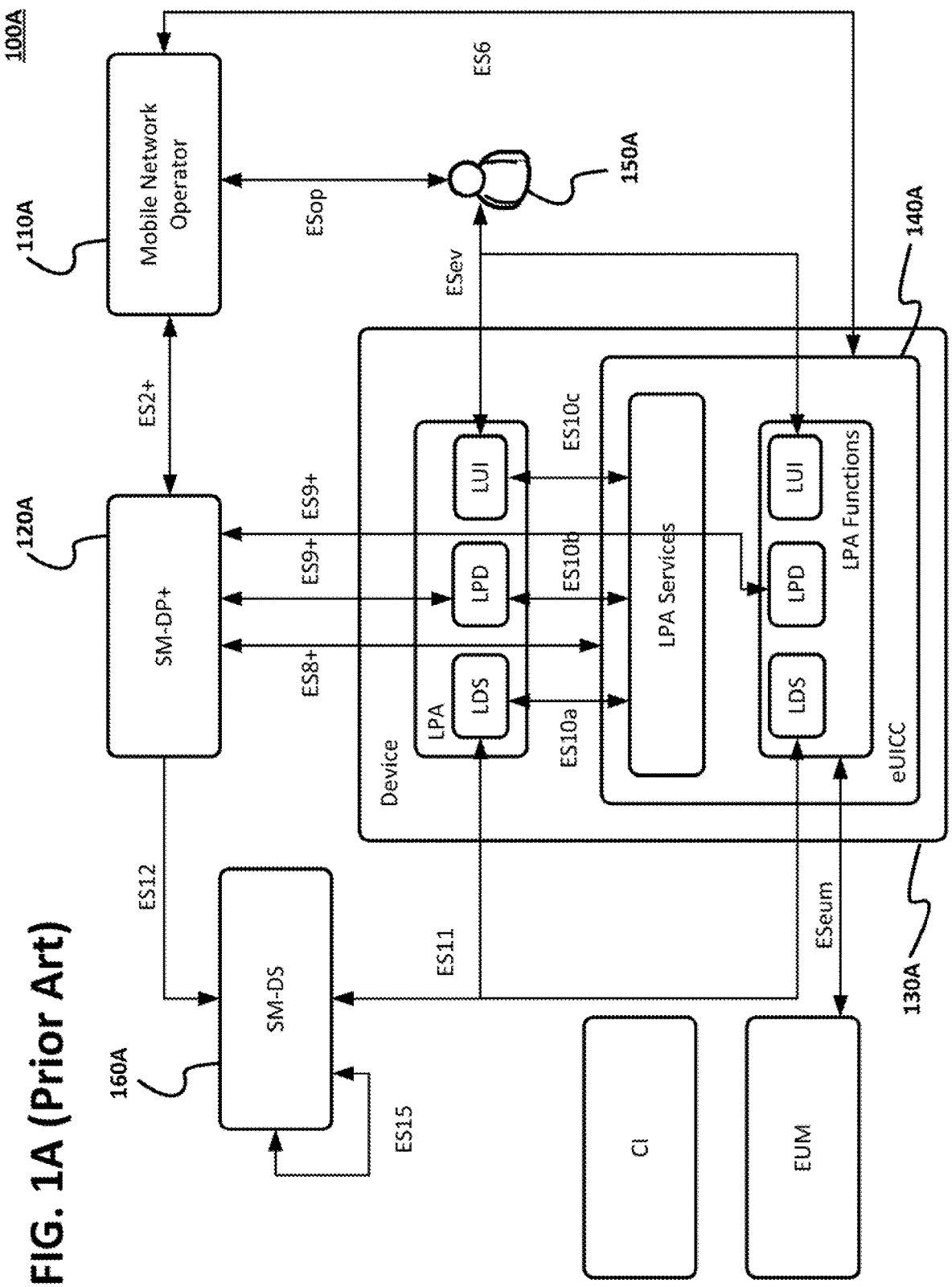
FIG. 1A is a block diagram illustrating a prior-art SM-DP+-based architecture suitable for provisioning data services to eSIM and/or iSIM devices.

Described herein is a novel platform including systems and methods to enable Advanced Remote SIM Provisioning ("ARSP"). ARSP enables the advanced securing of both open-ended subscriptions and metered/closed-ended (e.g., a limited, short, or one-time) connectivity services for eSIM capable devices/machines. Such connectivity services can be purchased or booked in advance from a local or foreign network operator. Acquired services may be activated immediately or at a predefined/undefined point in the future.

For example, a traveler to a foreign country can pre-purchase (e.g., at the travel booking stage) mobile connectivity for use with their device (e.g., mobile phone, tablet, laptop, hotspot, etc.) during upcoming international travel. The service can then be activated at the time/date of arrival for the selected travel period. This allows international travelers/roamers moving among different international networks to be able to conveniently "book" and configure the connectivity of their device(s) in advance and even before being physically in the visited destination(s)/network(s) unlike the prior-art RSP architectures and protocols described above. Booking of mobile services can occur in the same manner (and at the same time and using the same tools) used to book other travel services such as flights, hotels, trains, travel insurance, etc. Similarly, any user/machine can simply secure connectivity in advance and/or on-demand for only a limited period of time when needed—for a certain period (e.g. 1 week, 1 month, 1 year)—or another period defined by the user/machine with specific start and finish dates. Certain embodiments of the present invention efficiently facilitate mobile service provisioning by building upon existing systems and protocols while also minimizing the consumption of network resources and provisioning of profiles The ARSP systems and methods described herein can also be applied to other devices and machines (e.g., connected cars, drones, tools, etc.) to obtain connectivity (when not otherwise connected) within a network or to move between different (e.g., international) networks. This ability may be especially useful for short duration or one-time trips. This allows advance planning to acquire affordable and direct connectivity to local/visited networks instead of requiring plans with lengthy commitments or using expensive international roaming services.

Generally, ARSP enables acquisition and connectivity configuration of different devices by allowing international travelers/users to:

1—Check available connectivity offers for eSIM-capable devices for other countries/network(s) in advance. This can be done during a travel booking process or prior to connecting to the network.

2—Select, book and/or buy a relevant connectivity package/subscription for a trip e.g., capped or unlimited mobile data services for a pre-defined period (e.g., 1 week, 1 month) or for an exact duration, starting at Time of Arrival (TA) and ending with the Time of Departure (TD). This process is similar to how other international travel services like flights and hotels are acquired. In certain cases, the user may buy the service with or without cancelation and/or rescheduling options.

3—Configure the travel eSIM-capable device (e.g., using a QR code, or other similar link, or an application with the necessary privileges) to seamlessly work on the visited network during the trip by downloading the Bound Profile of the acquired package/subscription and having the equivalent travel eSIM ready for automatic/seamless activation during the trip.

4—Acquire local connectivity while in the visited network upon arrival by selecting the travel eSIM (typically using one click/selection on the device).

Figure 3:
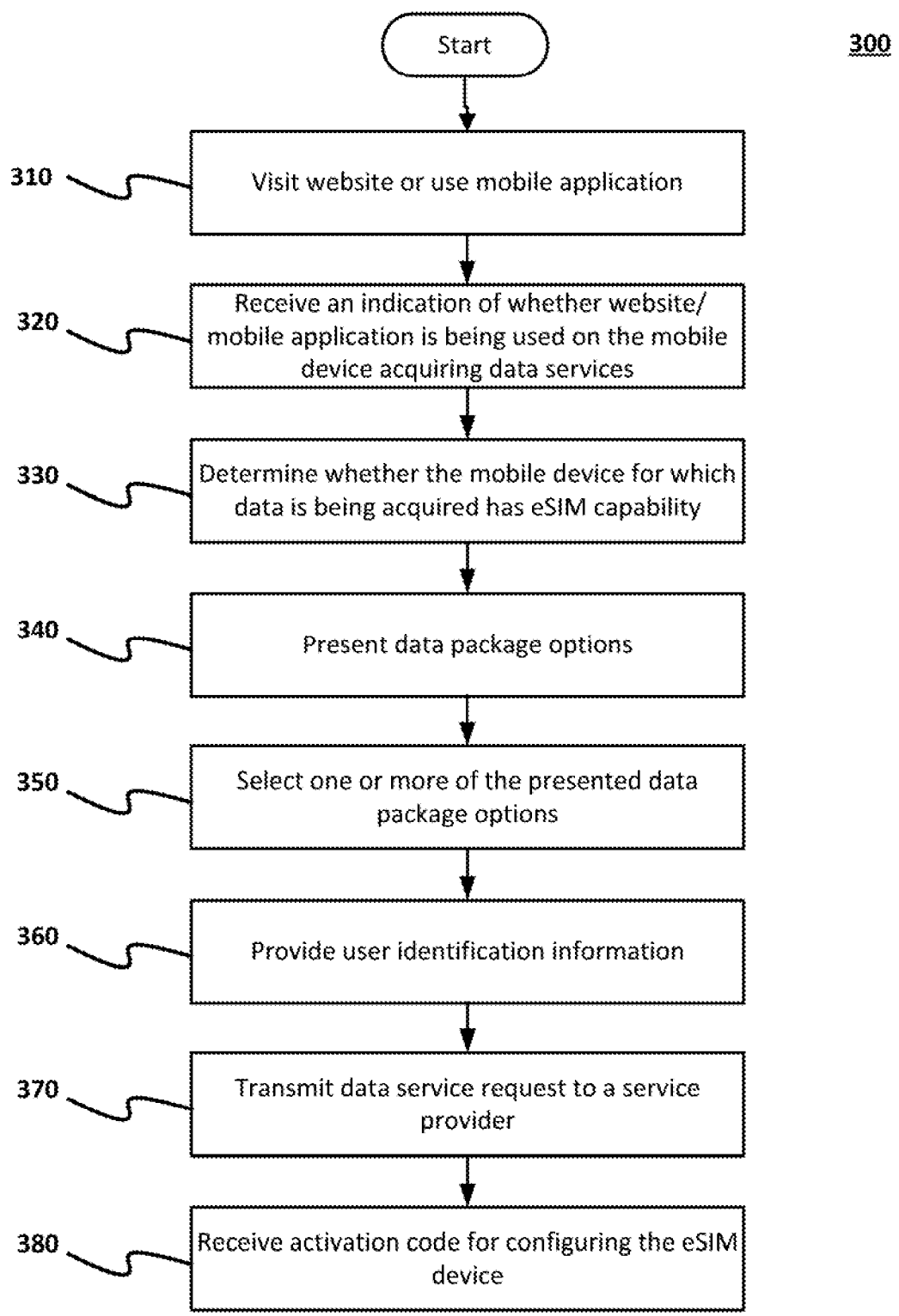
FIG. 3 is a flow diagram illustrating a method for acquiring mobile data services for mobile devices with eSIM and/or iSIM capability remotely, outside of the range of the providing mobile network in accordance with certain embodiments of the invention.

FIG. 3 illustrates an exemplary method 300 for acquiring mobile data services for mobile devices with eSIM capability, in accordance with certain embodiments of the present invention. In certain embodiments, method 300 may be used to remotely acquire mobile data service outside the range of the providing mobile network. The methods of FIG. 3 may be performed as part of a typical travel booking process or other process where a user has entered identifying information (e.g., name, address, credit cards). In step 310, a user may visit a website via a URL with a browser (or similar) or use a mobile application, etc. as an "Acquiring App". The Acquiring App may be used on the mobile device for which data is being acquired.

In step 320, an application or website may receive an indication of whether an Acquiring App is being used on the mobile device for which data services are being acquired. In step 330, the Acquiring App, a background service, or script may be used to determine whether the mobile device for which data is being acquired has eSIM capability. For example, if the Acquiring App is being used on the mobile device for which data is being acquired, the Acquiring App may determine if the mobile device has eSIM capability by querying the operating system (e.g., iOS, Android) of the mobile device, using an API, or via a processor instruction. In certain embodiments, the Acquiring App may determine if the mobile device has eSIM capability by detecting the presence of an eSIM application on the mobile device. In certain embodiments, an identifier (e.g., an IMEI, model number, FCCID, make/model) of the mobile device for which data is being acquired may be used to determine if the mobile device has eSIM capability. For example, if the Acquiring App is being used on the mobile device for which data is being acquired, the Acquiring App may determine an identifier by querying the operating system, using an API, or via a processor instruction. In certain embodiments, for example where the Acquiring App is not being used on the mobile device for which data is being acquired or when programmatic determination is unsuccessful, the user may be asked to input an appropriate identifier.

In step 340, the user may be presented with data package options by the Acquiring App. In certain embodiments, data package options are presented only after determining that the mobile device for which data is being acquired has eSIM capability. In certain embodiments, data package options are presented by the Acquiring App for one or more mobile networks to be encountered based on data received as part of a previously booked or contemporaneously booked travel package with associated time of arrival "TA" and/or time of departure "TD" and location information. In certain embodiments, Acquiring App receives this information from the user. For example, if a United States resident is booking European travel in England, France, and Spain—corresponding data packages may be presented for one or more mobile networks in those countries during the corresponding timeframe (time of arrival TA and time of departure TD) for each mobile network (e.g., based on country/region) to be visited. In step 350, the user may select one or more of the presented data package options, which may be received and or stored by the Acquiring App. In certain embodiments, data package options include information, such as trip information (e.g., TA, TD, extent of stay), service level (e.g., LTE, 3G, etc.), service duration (e.g., number of days, weeks, months), and/or service data amount (1 gigabyte, 40 gigabyte, unlimited).

In step 360, a user may provide the Acquiring App with user identification information (e.g., name, e-mail, credit card, mobile number). In certain embodiments, user information is provided as part of a previously booked or contemporaneously booked travel package, which may received/transmitted by the Acquiring App. In step 370, a data service request may be transmitted to a Service Provider (e.g., an "SP" with SM-DP++ functionality as discussed in more detail with respect to FIGS. 4, 5A-5D, 6, 7, and 9-10). In certain embodiments, transmitted data service request is associated with a secure element. In certain embodiments, data service request is transmitted when a secure element associated with the data service request is outside the range of a providing mobile network associated with SP. In certain embodiments, data service request may be transmitted to a Service Provider by Acquiring App. In certain embodiments, data service request may be transmitted to a Service Provider by a server (e.g., a web server) in communication with Acquiring App. In certain embodiments, a data service request may include any selected data package options (e.g., step 350 of FIG. 3), and/or trip information (e.g., location, TA, TD, extent of stay, etc.) (e.g., step 350 of FIG. 3) and/or user identification information (e.g., step 360 of FIG. 3), and/or a unique identifier associated with a secure element (e.g., eUICC). In step 380 (e.g., in response to step 370), a user may receive an activation code (e.g., QR code or URL) for configuring an eSIM device from a Service Provider. For example, a user may receive an email, SMS, etc. containing an activation code. In certain embodiments, an application (e.g., the Acquiring App) receives an activation code.

Figure 4:
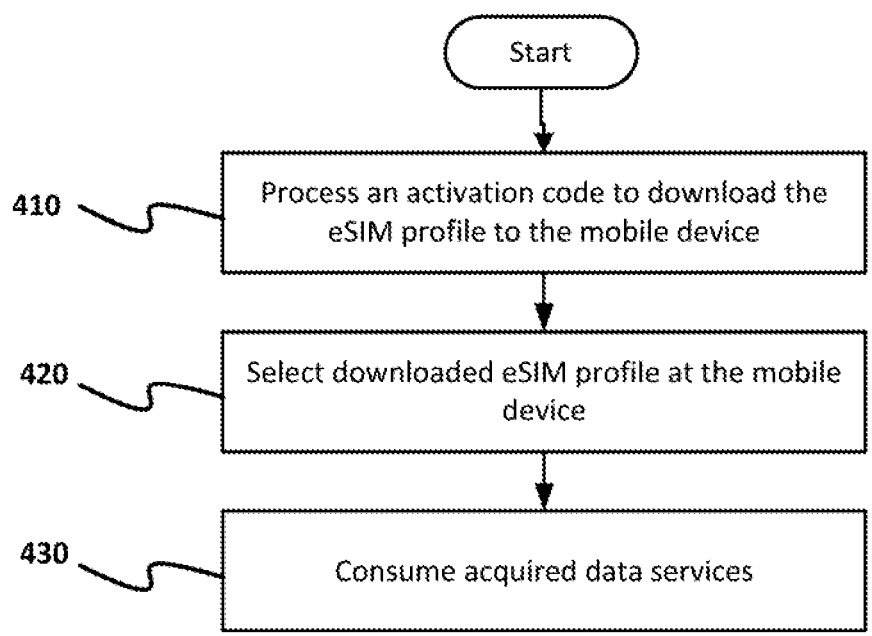
FIG. 4 is a flow diagram illustrating a method for enabling data capabilities on a mobile device for which data services on a remote network was/is being acquired in accordance with certain embodiments of the invention.

FIG. 4 illustrates an exemplary method 400 for enabling data capabilities on a mobile device for which data service on a remote network was/is being acquired, in accordance with certain embodiments of the present invention. In step 410, a mobile device for which data service is/was being acquired may process an activation code (e.g., an activation code received in step 370 of the method of FIG. 3). For example, a mobile device for which data services was/is being acquired may open a link or process a QR code to download an eSIM profile to the mobile device as is known in the art. In certain embodiments, this eSIM profile remains un-activated at the mobile network operator until needed at a later time (see, e.g., FIG. 10). In step 420, a previously downloaded eSIM profile (e.g., a profile downloaded in step 410) may be selected at the mobile device. In certain embodiments, the eSIM profile is selected at the mobile by the user upon arrival at a roaming network. In certain embodiments, the eSIM profile is automatically selected based on data stored as part of an Acquiring App (e.g., TA, TD, mobile network information). In certain embodiments, automatic selection may be based on a comparison with the current state of mobile (e.g., roaming, current date/time). In step 430, data associated with the acquired data services may be consumed by the mobile device.

Using the principles described herein, travelers who anticipate moving among different international networks are able to conveniently "book" or "pre-purchase" and configure the connectivity of their device(s) in advance and before being physically in the visited destination(s)/network (s). This can be accomplished at the same time and/or using the same tools employed to book other travel services such as flights, hotels, trains, travel insurance, etc. For example, a user of a travel-booking website (such as Expedia) booking a certain itinerary may be presented (or redirected) through the site to add a connectivity service in addition to or as part of a bundle with other travel services. Because the user will have established travel dates, and provided customer ID, payment info, location of travel, etc., this data can be used/pulled from the itinerary to acquire mobile services in an ARSP system. In certain embodiments, an application, background service or script (e.g., executed by a browser) may detect that the associated device has eUICC/eSIM compatibility/capability. In cases where eUICC/eSIM compatibility/capability is detected, mobile service bundles may be offered as discussed above. In certain other cases, the user may be questioned as to whether they have a compatible device (e.g., by selecting from a list of known devices). In other cases, where the user is unsure about their device (or the device is different from the one being used for booking), a link may be sent and opened on the desired device to check and confirm compatibility. Following confirmation of device compatibility, the user may be presented with the option to purchase mobile services.

While the foregoing describes certain use cases (e.g., in connection with pre-travel connectivity purchases), it will be understood that other use cases are contemplated and possible (e.g. obtaining intermittent connectivity services for a particular device or machine within a local network or any other network) without departing from the spirit of the invention. Certain exemplary embodiments of the invention are further illustrated and discussed below, with the understanding that other variations are possible.

ARSP is able to dynamically schedule and allocate time-restricted "Protected Profiles" via advanced SM-DP+ systems and methods, which are herein referred to as "SM-DP++." SM-DP++ can be efficiently deployed and integrated with existing RSP systems and mobile networks. FIGS. 5A-5D illustrate four exemplary architecture embodiments for enhancing SM-DP/SM-DP+ technology. These enhancements are referred to herein as "SM-DP++." Such SM-DP++ architectures may enable the provisioning of mobile data services to devices outside of the communication range of the providing mobile network (e.g., items 510A-510D of FIGS. 5A-5D).

Figure 5A:
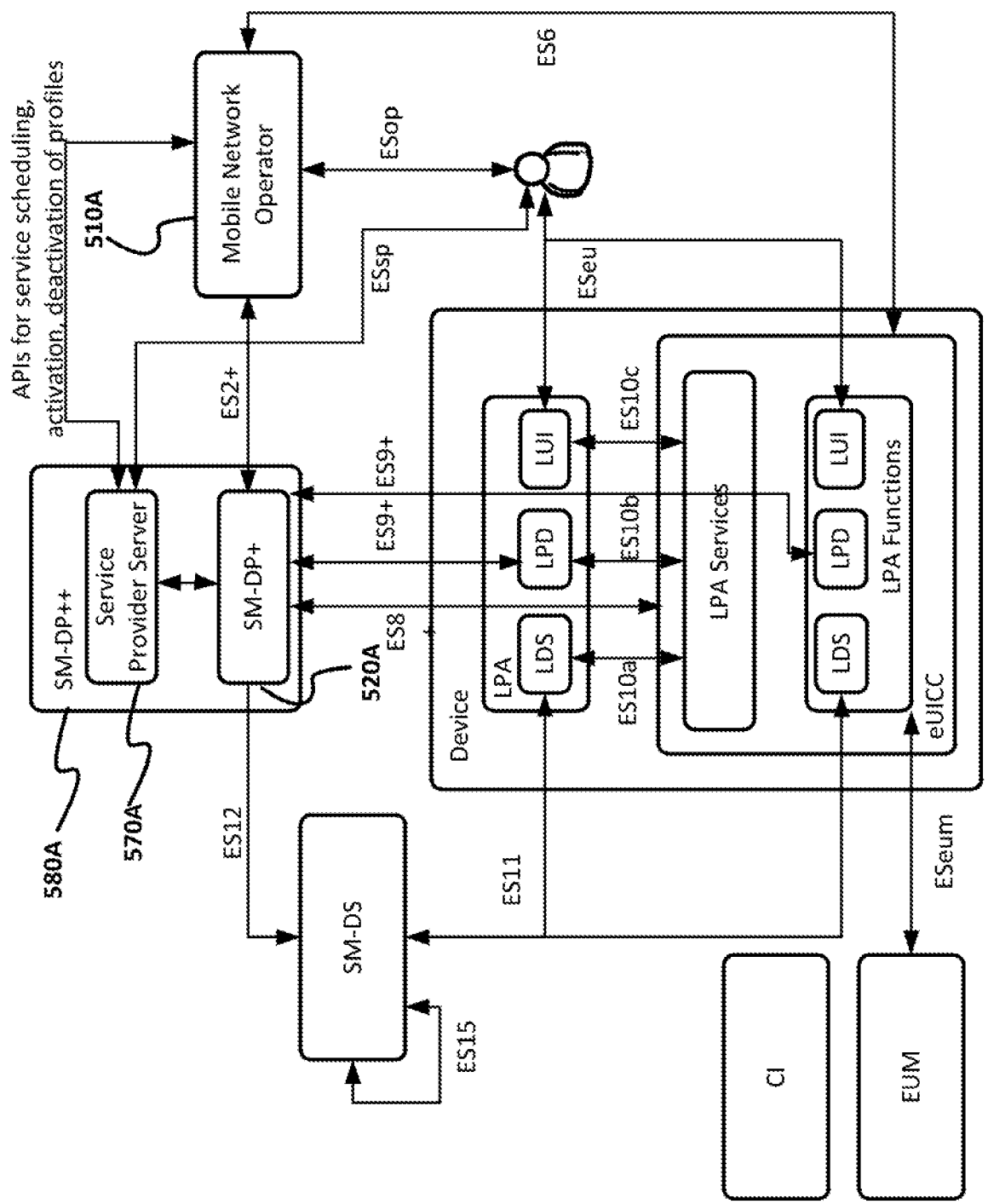
FIG. 5A is a block diagram illustrating improvements to a prior-art SM-DP+-based architecture that is suitable for provisioning data services to eSIM and/or iSIM devices remotely from the providing mobile network in accordance with certain embodiments of the invention.
Figure 5B:
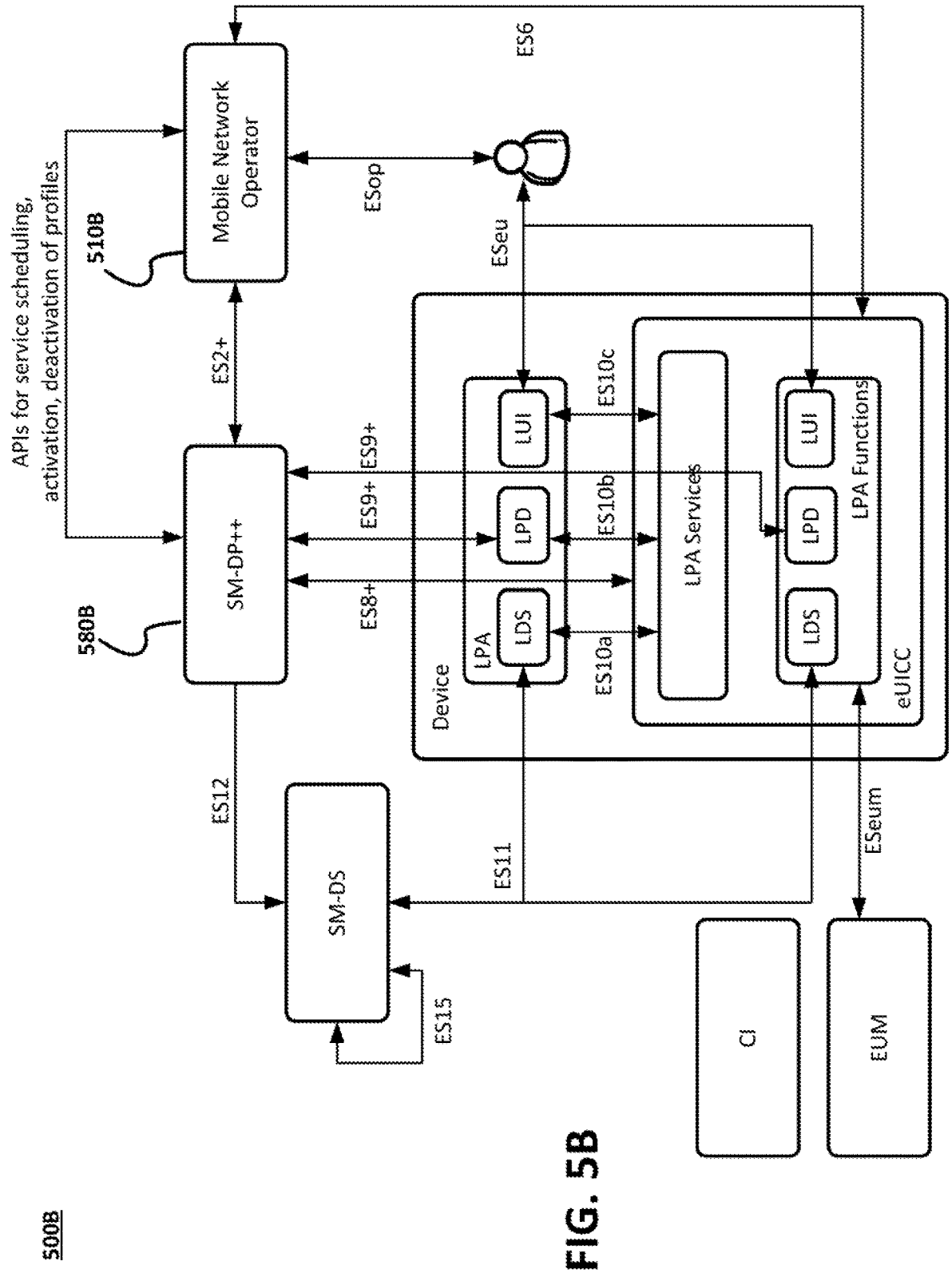
FIG. 5B is a block diagram illustrating improvements to a prior art SM-DP+-based architecture that is suitable for provisioning data services to eSIM and/or iSIM devices remotely from the providing mobile network in accordance with certain embodiments of the invention.
Figure 5C:
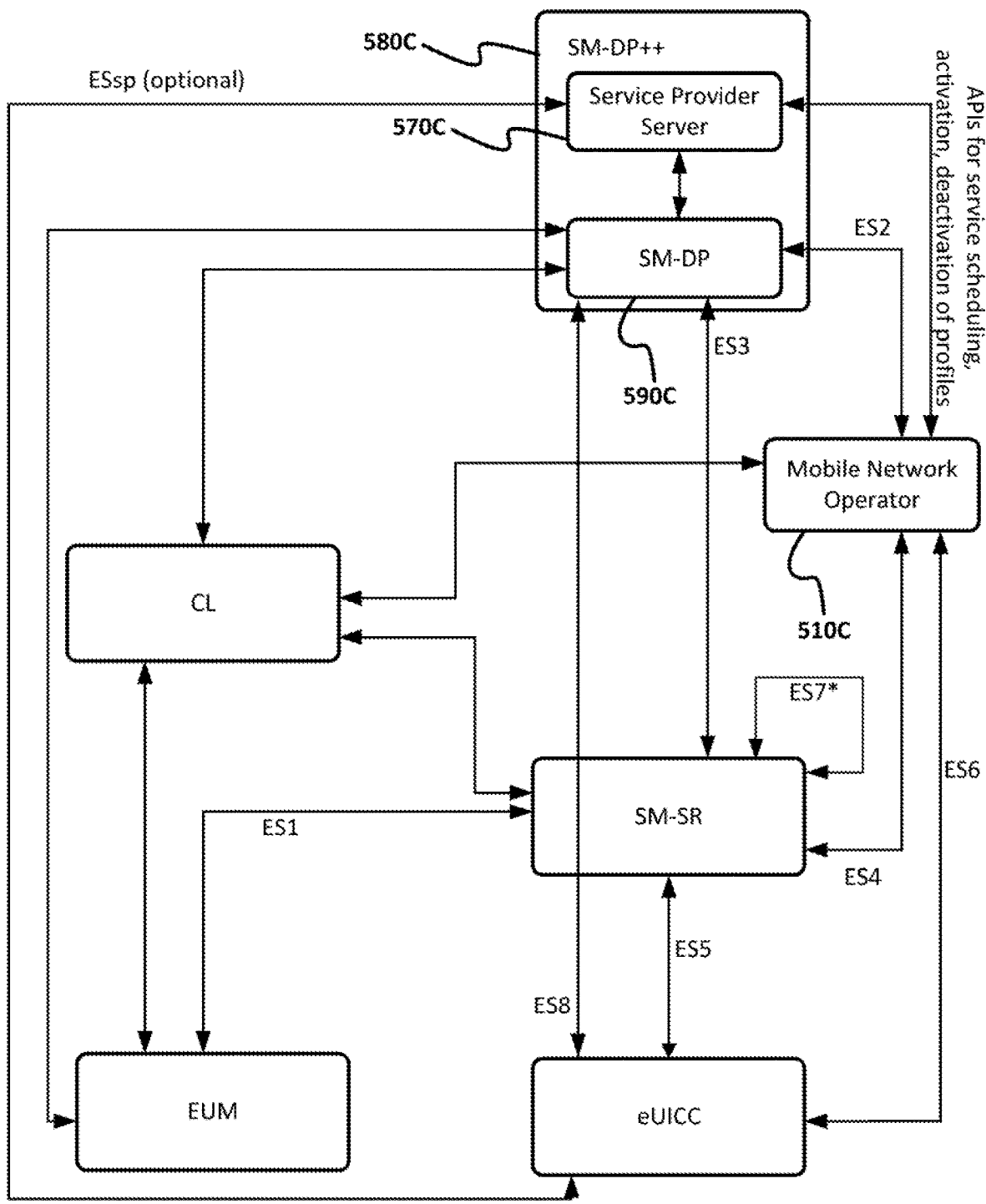
FIG. 5C is a block diagram illustrating improvements to a prior art SM-DP-based architecture that is suitable for provisioning data services to eSIM and/or iSIM devices remotely from the providing mobile network in accordance with certain embodiments of the invention.
Figure 5D:
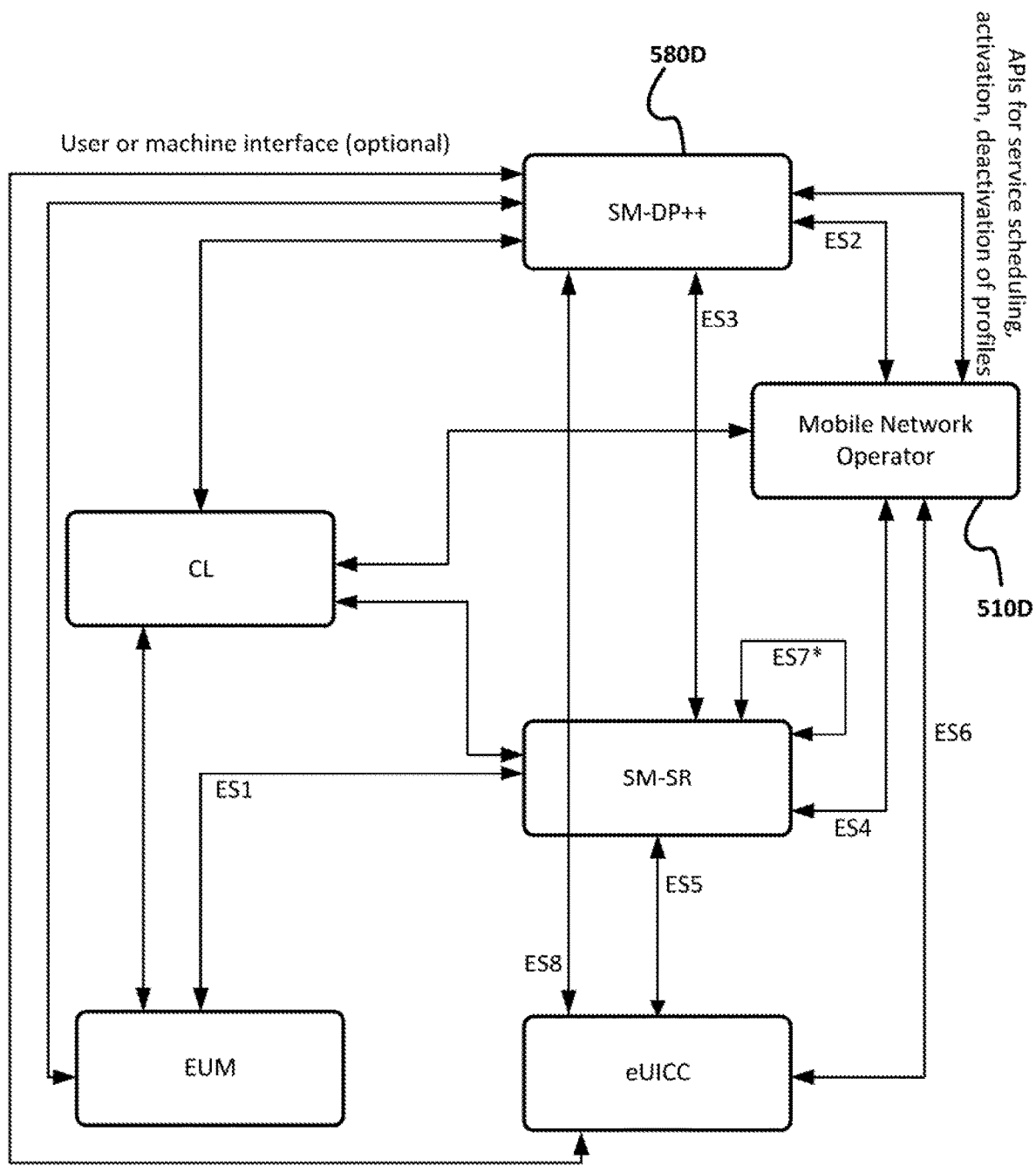
FIG. 5D is a block diagram illustrating improvements to a prior art SM-DP-based architecture that is suitable for provisioning data services to eSIM and/or iSIM devices remotely from the providing mobile network.

FIGS. 5A and 5B respectively illustrate exemplary architectures 500A and 500B for upgrading SM-DP+ based systems, in accordance with certain embodiments of the present invention. FIGS. 5C and 5D, on the other hand, respectively illustrate exemplary architectures 500C and 500D for upgrading SM-DP based systems, in accordance with certain embodiments of the present invention. As demonstrated in the FIG. 5A and FIG. 5C embodiments, an SM-DP++ (item 580A in FIG. 5A or item 580C in FIG. 5C) is illustrated via enhancements that may be provided via a "Service Provider Server" or "SPS" item 570A in FIG. 5A or item 570C in FIG. 5C interfacing with an existing SM-DP+ (item 520A) in FIG. 5A or an SM-DP (item 590C) in FIG. 5C. An SPS may enable advanced functionalities relating to profile package scheduling and allocation shown and discussed with respect to FIGS. 6, 7, and 9-10. These embodiments may be relevant to mobile services offered by third party service providers other than the network operator (MNO). Such service providers may be known as a Mobile Virtual Network Operator ("MVNO"). For example, the Service Provider ("SP") may be an MVNO that owns/controls the Service Provider Server ("SPS") and interacts with the MNO via standard API's. The SPS may also interact with the user (mobile device) via an ESsp interface (which may be implemented in various forms, including: web and/or mobile site/app/store, QR code, SMS, API provided to third parties, etc.).

Figure 1B:
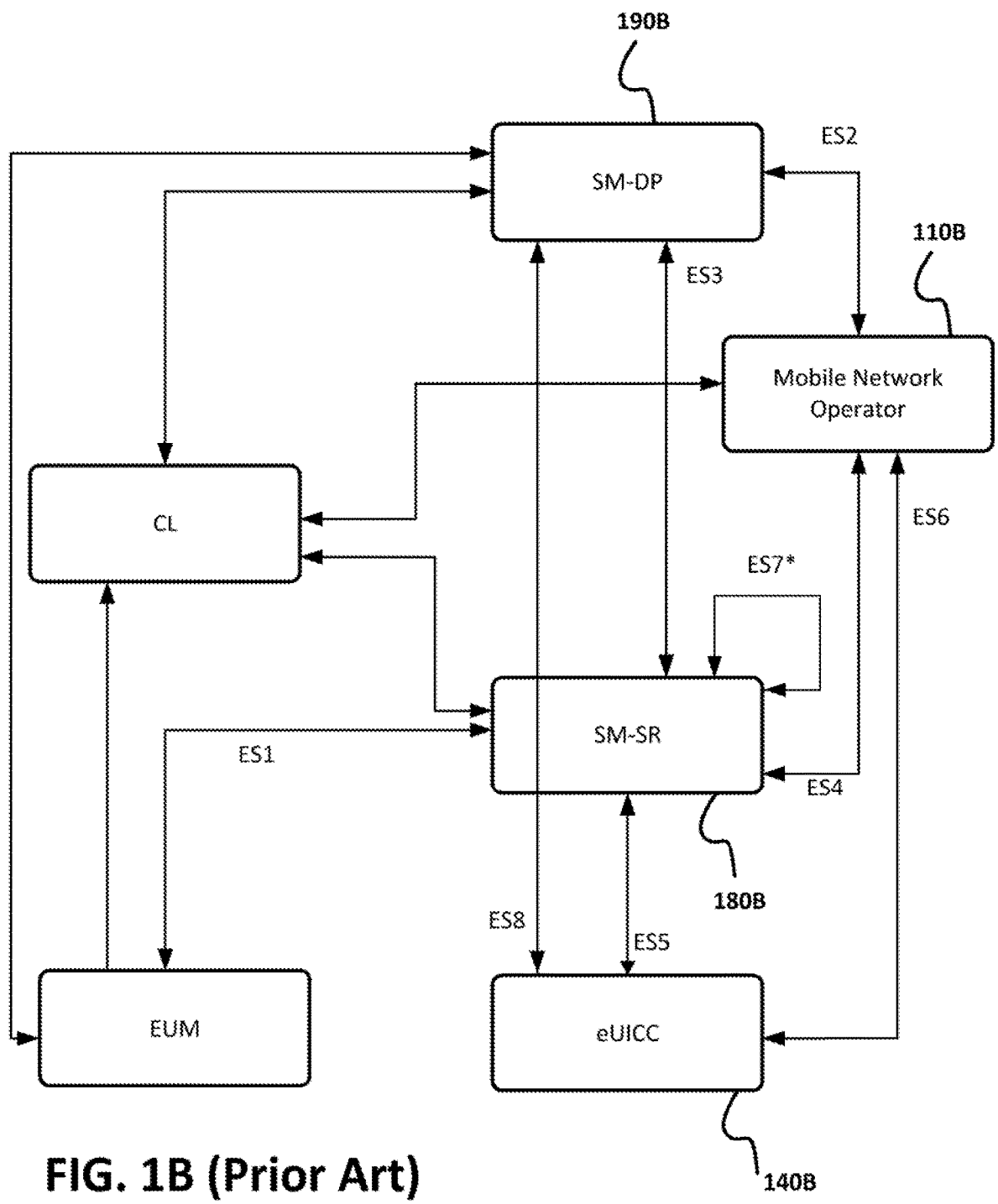
FIG. 1B is a block diagram illustrating a prior-art SM-DP-based architecture suitable for provisioning data services to eSIM and/or iSIM devices.
Figure 2:
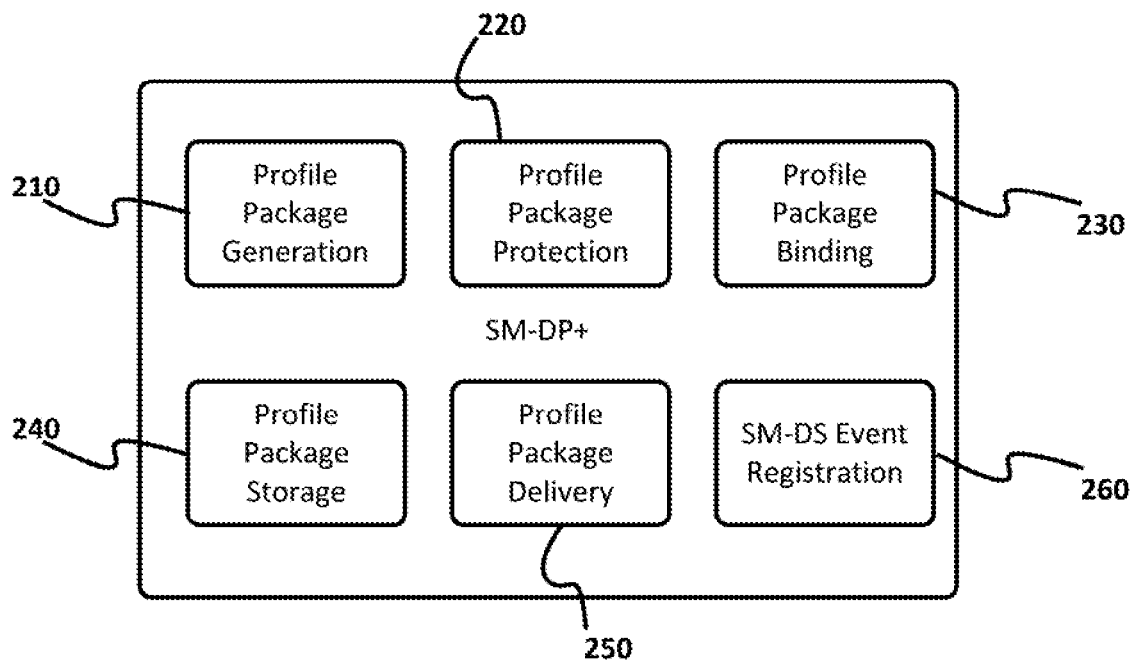
FIG. 2 is a block diagram illustrating certain components of a prior-art SM-DP+ suitable for provisioning data services to eSIM and/or iSIM devices.

Alternatively, as shown in FIGS. 5B and 5D, an SM-DP++ (item 580B of FIG. 5B or item 580D of FIG. 5D) may also take the form of an integrated system (e.g., a server) including both the Service Provider Server (item 570A in FIG. 5A or item 570C in FIG. 5C) and SM-DP+ functionality (item 120A of FIG. 1A) or SM-DP functionality (item 190B of FIG. 1B) in one entity. In this case, the mobile network operator would be directly interacting with the end user. Like the SPS embodiments of FIGS. 5A and 5C, these integrated SM-DP++ embodiments enable advanced functionalities relating to profile package scheduling and allocation shown and discussed with respect to FIGS. 6, 7, and 9-10.

Figure 6:
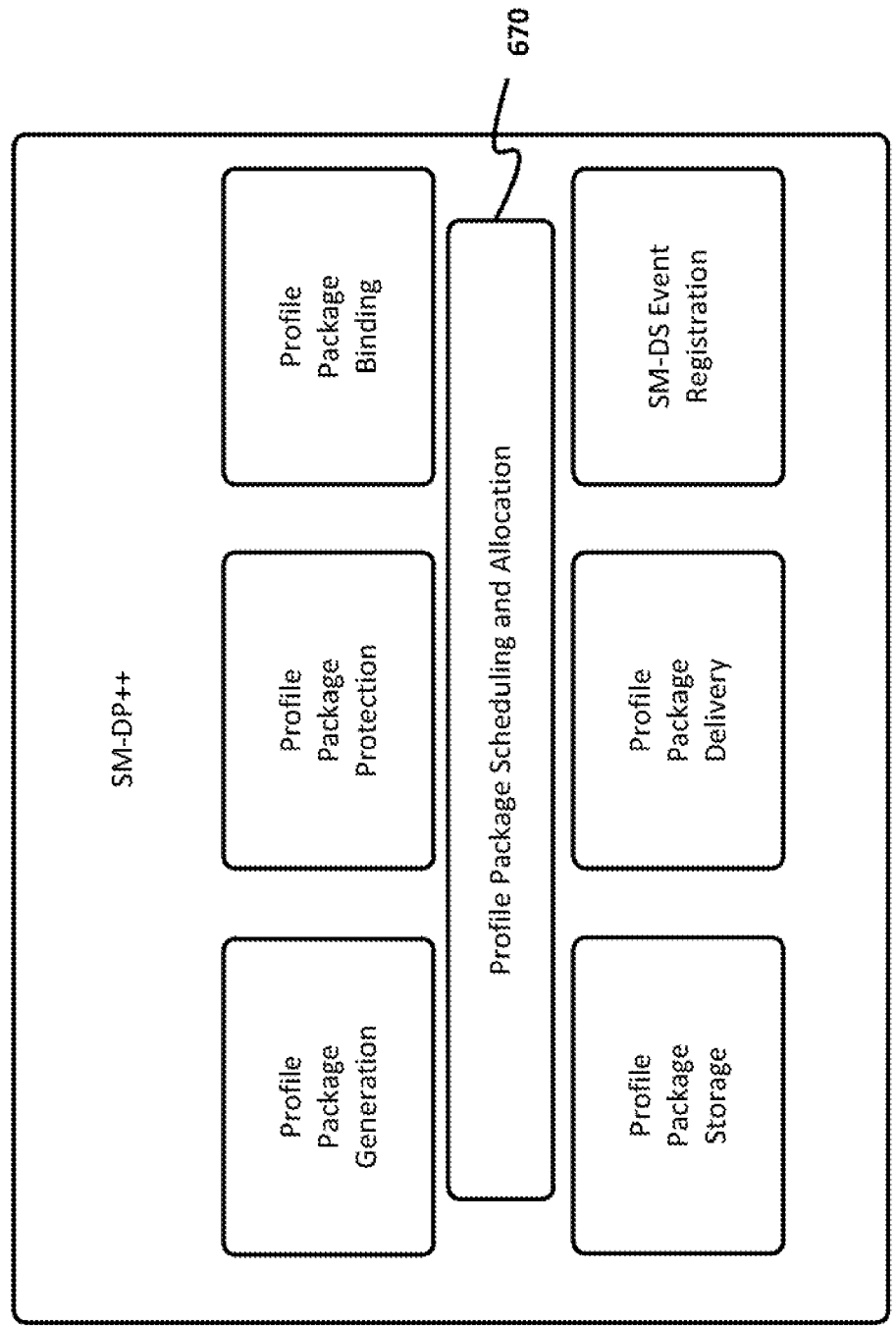
FIG. 6 is a block diagram illustrating certain components of an SM-DP++ suitable for provisioning data services to eSIM and/or iSIM devices remotely from the providing mobile network in accordance with certain embodiments of the invention.

FIG. 6 illustrates exemplary functional components of an SM-DP++ 600 (e.g., items 580A-D of FIGS. 5A-D), in accordance with certain embodiments of the present invention. Here, SM-DP++ functionality is primarily provided by a Profile Package Scheduling and Allocation module (item 670 of FIG. 6). SM-DP++ may be hardware-based, software-based, non-transitory computer readable medium based, and/or comprise a mixture of hardware, software, and/or non-transitory computer readable media elements. As introduced above, this Profile and Package Scheduling and Allocation module may alternatively be incorporated into an SPS (e.g., as shown in FIGS. 5A or 5C), as part of an SM-DP+ (e.g., as shown in FIG. 5B), or as part of an SM-DP (e.g., as shown in FIG. 5D).

To utilize the above added SM-DP++ functionality, an international traveler/roamer may proceed through the process described in relation to FIG. 3 discussed above. SM-DP++ functionality may enable such "in-advance" connectivity booking and configuration for future connection to a foreign/remote network by efficiently mapping a "Protected Profile" (which is a valuable resource that is typically provisioned for regular, long-term subscribers) not only to an EID (as in the case of a prior-art SM-DP+) but also to a service validity period. This service validity period may be derived from a trip itinerary with a specific date and/or Time of Arrival (TA) and Time of Departure (TD). Alternatively, the service validity period may be a pre-defined period like 1 week, 1 month or 1 year prior to or from a certain date.

Figure 7:
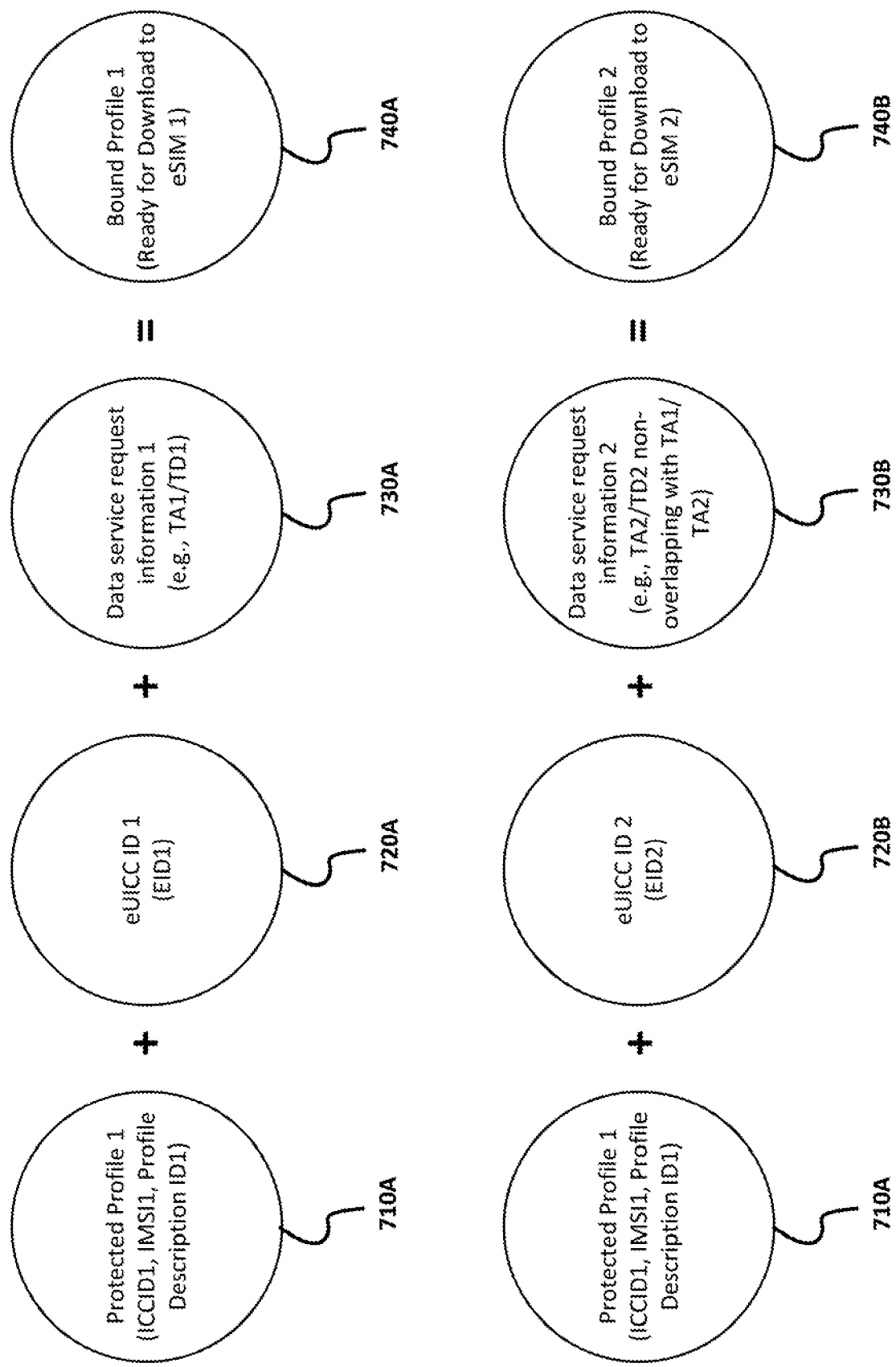
FIG. 7 is an illustration depicting how an ARSP-based system manages both Protected Profiles and Bound Profiles in accordance with certain embodiments of the invention.
Figure 8:
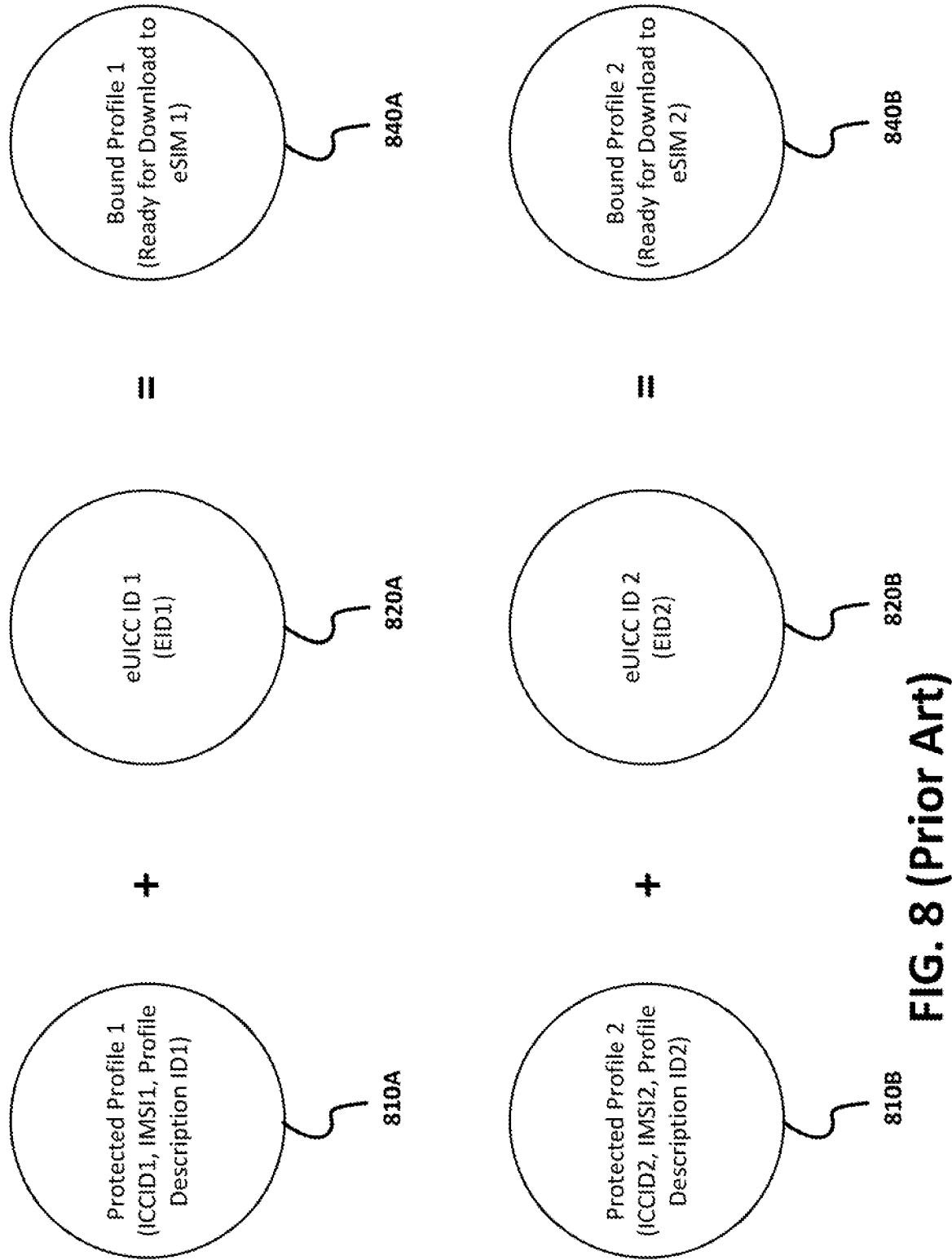
FIG. 8 is an illustration depicting how a prior-art RSP-based system manages both Protected Profiles and Bound Profiles.

In accordance with certain embodiments of the present invention, FIG. 7 illustrates how SM-DP++ technology enables a single Protected Profile (710A) to be used as two separate Bound Profiles (740A, 740B) when associated with information from one or more non-overlapping data service requests (730A, 730B) and an one or more secure element IDs (e.g., UICC IDs 720A or 720B). Data service request information may be trip information such as TA/TD discussed above. SM-DP++ technology of FIG. 7 is shown in contrast to the prior-art SM-DP+/SM-DP functionality of FIG. 8, which requires two separate Protected Profiles (810A, 810B) and two distinct secure element IDs (e.g., eUICC IDs 820A, 820B) in order to generate two separate Bound Profiles (840A, 840B).

SM-DP++'s advanced scheduling-based mapping, which may be provided by a Profile and Package Scheduling and Allocation module, compared to that of the prior-art SM-DP/SM-DP+ which lacks the functionality of a Profile and Package Scheduling module is illustrated in FIG. 7. Advanced SM-DP++ mapping which may be provided by a Profile and Package Scheduling and Allocation module enables the efficient scheduling of a valuable mobile network/service resource (i.e., "Protected Profile") to be utilized by many secure elements (e.g., eUICCs with multiple EID's) and correspondingly, many users. These users may be visiting the same mobile network during non-overlapping time periods. Accordingly, SM-DP++ may enable sharing and reuse of "Protected Profiles", thereby making short-term connectivity service more feasible to both MNOs (or MVNOs) and international travelers/users. Typically, over 94% of short-term users spend a maximum of 2 weeks on a given trip to a country like the United States. The scheduling and "Protected Profile" "recycling" features of SM-DP++ can also be beneficial to any other/local devices (e.g., wearables) that require short-term, intermittent connectivity services instead of a regular subscription, which is typically long-term.

Figure 9:
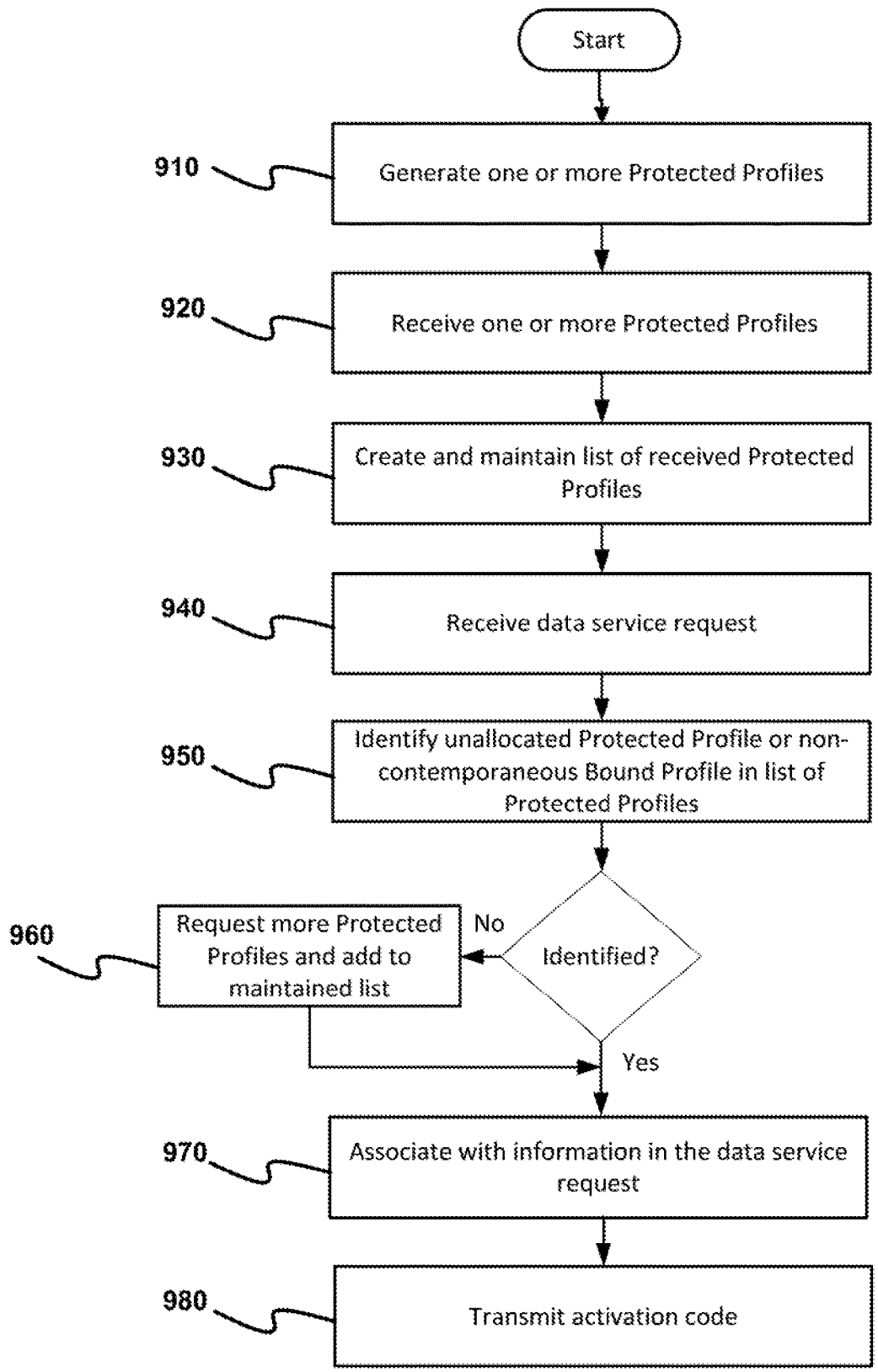
FIG. 9 is a flow diagram illustrating a method for managing Protected and Bound Profiles at an SM-DP++ using data service request information in accordance with certain embodiments of the invention.

FIG. 9 illustrates an exemplary method 900 for implementing certain SM-DP++ functionality (e.g., as a Profile Package Scheduling and Allocation module of FIG. 6), in accordance with certain embodiments of the present invention. The method of FIG. 9 may be used in accordance with any of the architectures described with respect to FIGS. 5A-5D. Generally, to prevent the same "Protected Profile" from becoming multiple "Bound Profiles" at the same time, SP-DP++ functionality may associate references to "Protected Profiles" stored/generated/available on an SM-DP++ with an expected service validity period/time of use (e.g., TA-TD). Accordingly, SM-DP++ may manage Protected and Bound Profiles using received data service request information.

In step 910, a set of "Protected Profiles is generated, which are allocated for a Service Provider (SP). A set of "Protected Profiles" may be generated by a mobile network operator or by using resources supplied by a MNO (e.g., through an existing SM-DP+ or SM-DP). In step 920, an SP may receive a set of "Protected Profiles," (e.g., Protected Profiles generated in step 910). In step 930, a Service Provider (e.g., at an SPS, such as item 570A in FIG. 5A or item 570C in FIG. 5C) may create and maintain a list of Protected Profiles (e.g., Protected Profiles received in step 920). In certain embodiments, a list of Protected Profiles is maintained using unique reference information, such as pointers similar to: Profile ID's, International Mobile Equipment Identities ("IMEIs") or other unique information identifying a handset/device, Integrated Circuit Card Identifiers ("ICCIDs") or other information associated with a SIM or secure element, International Mobile Subscriber Identity ("IMSI") or other information identifying an account, Authentication Keys or other cryptographic information. In certain embodiments, a list of Protected Profiles is maintained without storing sensitive profile information, such as IMSI's or Authentication keys.

In step 940, a data service request may be received by an SP. In certain embodiments, a data service request is associated with a secure element (e.g., an eUICC/iUICC). In certain embodiments, a data service request may include or specify a service validity timeframe for when the secure element will be within range of a particular mobile network operator or other information (see e.g., step 370 of FIG. 3). In step 950, an SP (e.g., via SPS or integrated SM-DP++) may identify either an Unallocated Protected Profile (a Protected Profile not associated with any data service requests) or a Bound Profile in its maintained list of Protected Profiles that would not be contemporaneously allocated using the information in a received data service request (an "Open" Bound Profile). For example, an SP may search a list of Bound Profiles to identify at least one Bound Profile that is not allocated during a service validity period (e.g., TA/TD) specified in a data service request. If no Open Bound Profile or no Unallocated Protected Profile is found, in step 960, an SP may request one or more new Protected Profiles (e.g., from a mobile network operator) and add any received Protected Profiles to a maintained list of Protected Profiles as Unallocated Protected Profiles. In step 970, when an Open Bound Profile or Unallocated Protected Profile is identified (e.g., in step 950 or 960), the Protected Profile may be associated with information in a data service request (e.g., a service validity period, such as TA/TD). In the case of an Unallocated Protected Profile, the Unallocated Protected Profile will become a Bound Profile. In the case of an Open Bound Profile, the instant data service request will be further associated with the Bound Profile along with any prior data service request information associated with the Bound Profile. In step 980 (e.g., in response to receiving a data service request as in step 940 and associating a Bound Profile with the data service request), an SP (e.g., via SPS or integrated SM-DP++) may transmit an activation code (e.g., step 380 of FIG. 3).

Figure 10:
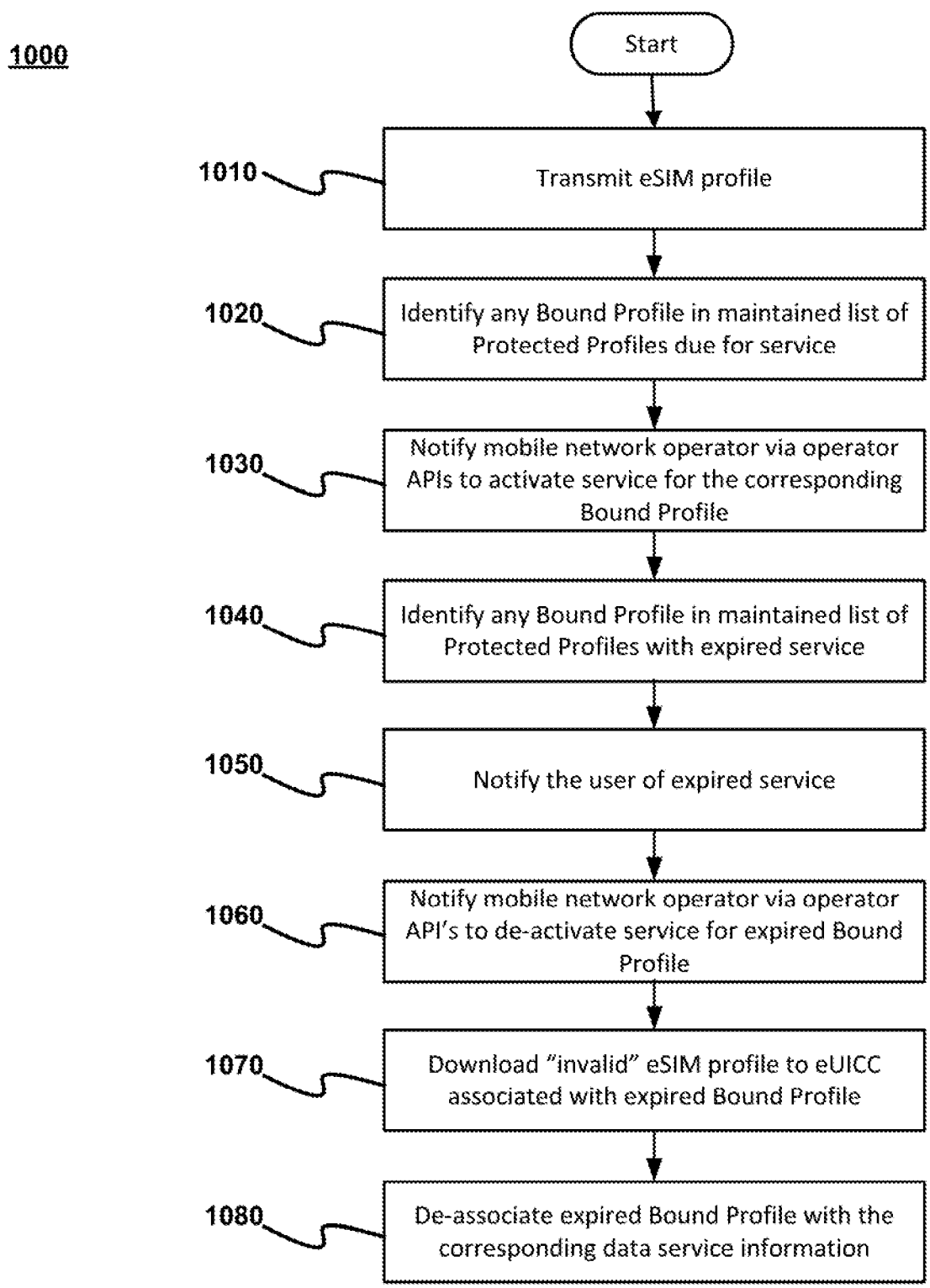
FIG. 10 is a flow diagram illustrating a method for managing the activation and deactivation of Bound Profiles between an SP-DP++ and a mobile network in an ARSP architecture in accordance with certain embodiments of the invention.

FIG. 10 illustrates an exemplary method 1000 for implementing certain SM-DP++ functionality (e.g., as a Profile and Package Scheduling module, see FIG. 6), in accordance with certain embodiments of the present invention. The method of FIG. 10 may be used in accordance with any of the architectures described with respect to FIGS. 5A-5D and in accordance with the methods of FIGS. 3, 4, and 9. Method 1000 may be used to manage the activation and deactivation of Bound Profiles between an SM-DP++ and a mobile network in an ARSP architecture. Generally, SP manages Bound Profiles with the mobile operator based on data service request information associated with the Bound Profile (see FIG. 9). At the designated time for beginning a service validity period (e.g., TA), contact may be made to the mobile network operator to activate the eSIM with its "Bound Profile." Communication may occur with the mobile network operator via APIs to activate the Bound Profile. For example, an SPS, an app, etc. may contact a mobile network operator to activate service for the Bound Profile via APIs provided by the mobile network operator. Similarly, in certain embodiments, at a designated ending of a service validity period (e.g., TD) contact may be made (e.g., through provided APIs) to the mobile network operator to de-activate the eSIM along with its "Bound Profile." In certain embodiments, prior to de-activation, a notification is sent to inform a user of impending deactivation and/or to allow the user to renew service.

In step 1010, for example, in response, to a user processing an activation code (e.g., step 380 of FIG. 3 or step 980 of FIG. 9), an eSIM profile may be transmitted (downloaded to) a user's device (e.g., via an ESsp interface). To process an activation code, a user may, for example, scan a QR code or click a link. In step 1020, an SP (e.g., via an SPS or an integrated SM-DP++) may identify any Bound Profile in a maintained list of Protected Profiles (or list of Bound Profiles) that is due for service. For example, an SP may identify any Bound Profiles with data service information (e.g., service validity period, such as TA) corresponding to the current date/time. In step 1030, in response to identifying any Bound Profiles that are due for service, an SP may notify a mobile network operator (e.g., via operator APIs) to activate service for the corresponding Bound Profile.

In step 1040, an SP (e.g., via an SPS or an integrated SM-DP++) may identify any Bound Profile in a maintained list of Protected Profiles (or list of Bound Profiles) that have expired service. For example, an SP may identify any Bound Profiles with data service information (e.g., service validity period, such as TD) corresponding to the current date/time. In step 1050, in response to identifying any such Bound Profiles that have expired service, an SP may notify a user (e.g., via text message, e-mail, phone call) of such expired (or expiring) service. In step 1060, in response to identifying any such Bound Profiles that have expired service, an SP may notify a mobile network operator (e.g., via operator API's) to de-activate service for the corresponding expired Bound Profile. Although generally steps can be performed in any order, it may be preferable to perform step 1050 (when/if step 1050 is performed) before step 1060 to better ensure delivery of an expired service message to a user.

In step 1070, in order to avoid having two of the same "Protected Profiles" being used on a network at the same time, an SP (e.g., via an SPS or an integrated SM-DP++) may cause a special or "invalid" eSIM/iSIM profile to be downloaded/stored to the secure element (e.g., eUICC/iUICC) associated with the expired Bound Profile to replace, deactivate or delete a previously valid "Bound Profile" at the expiration of the determined usage period/allocation of the associated profile (e.g., service validity period). In certain embodiments, an application with appropriate permissions (on the mobile device associated with the secure element replaces a previously valid "Bound Profile" or deactivates or deletes such a profile. Replacing a previously valid "Bound Profile" with an invalid profile may use an SM-DP/SM-DP+ or emulation thereof, and may utilize an over-the-air functionality (or emulation thereof) (e.g., similar to that available in SM-DP/SM-DP+) to remotely/locally send deactivation/deletion instructions to the secure element (or the "Bound Profile") once its service expires. In certain embodiments, download/storing of an invalid profile may be triggered (e.g., upon service expiration) by the secure element (e.g., eSIM/UICC) itself (e.g., via a SIM-stored app) or by an application having access to the secure element (e.g., an application stored or executing on the same device as an UICC/eSIM/iSIM).

In step 1080, in response to identifying any such Bound Profiles that have expired service, an SP may de-associate the Bound Profile with the corresponding data service information or otherwise delete/remove the corresponding data service information. If there is no corresponding data service information remaining associated with the Bound Profile, the Bound Profile may return to being an Unallocated Protected Profile.

While there have been shown and described various novel features of the invention as applied to particular embodiments thereof, it will be understood that various omissions and substitutions and changes in the form and details of the systems and methods described and illustrated, may be made by those skilled in the art without departing from the spirit of the invention. Those skilled in the art will recognize, based on the above disclosure and an understanding therefrom of the teachings of the invention, that the particular hardware and software processes that are parts of the foregoing figures and corresponding descriptions, and the general functionality provided by and incorporated therein, may vary in different embodiments of the invention. Indeed, the embodiments described in this disclosure can be combined in various ways. Any aspect or feature that is described for one embodiment can be incorporated into any other embodiment mentioned in this disclosure. Moreover, any of the embodiments described herein may be hardware-based, software-based, non-transitory computer readable medium based, and/or comprise a mixture of hardware, software, and/or non-transitory computer readable media elements. Accordingly, the particular system components and processes shown and/or discussed above are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation.

What is claimed is:

1. A mobile network system for provisioning mobile data services for one or more mobile devices that employ a secure element, the system comprising:
   a hardware-based subscription manager data preparation server, wherein the subscription manager data preparation server is configured to:
   maintain a list of protected profiles, wherein the protected profiles are associated with one or more credentials of a mobile network operator of a mobile network;
   when the secure element is outside a distance-based communication range of the mobile network, receive a data service request associated with the secure element, the data service request specifying a first timeframe for when the secure element is expected to be within the distance- based communication range of the mobile network;
   identify a first available protected profile in the maintained list of protected profiles using the first timeframe specified in the received data service request;
   create a bound profile by associating the identified first protected profile with the received data service request and a unique identifier associated with the secure element;
   receive a second data service request associated with a second secure element, the second data service request specifying a second timeframe for when the second secure element is expected to be within the distance-based communication range of the mobile network;
   identify a second available protected profile in the maintained list of protected profiles using the second timeframe specified in the received second data service request; and
   create a second bound profile by associating the identified second protected profile with the second received data service request and a second unique identifier associated with the second secure element, wherein the second protected profile is the same as the first protected profile and the first timeframe and second timeframe do not overlap.

2. The mobile network system of claim 1, wherein the subscription manager data preparation server is further configured to:
   identify a second bound profile that is due for service by using a data service request associated with the second bound profile; and
   activate service for the second bound profile due for service by communicating with the mobile network operator.

3. The mobile network system of claim 1, wherein the subscription manager data preparation server is further configured to:
   identify a second bound profile with expired service by using a data service request associated with the second bound profile;
   de-activate service for the second bound profile with expired service by communicating with the mobile network operator; and
   de-associate the associated data service request and the second bound profile with expired service.

4. The mobile network system of claim 3, wherein the subscription manager data preparation server is further configured to:

notify a user of the second bound profile with expired service; and download an invalid subscriber identity module (SIM) profile to the secure element associated, via the unique identifier, with the second bound profile with expired service.

5. The mobile network system of claim 1, wherein the secure element is an embedded Universal Integrated Circuit Card.

6. The mobile network system of claim 1, wherein the secure element is an integrated Universal Integrated Circuit Card.

7. The mobile network system of claim 1, wherein the subscription manager data preparation server comprises a service provider server in communication with an SM-DP+.

8. The mobile network system of claim 1, wherein the subscription manager data preparation server comprises a service provider server in communication with an SM-DP.

9. The mobile network system of claim 1, wherein the subscription manager data preparation server is integrated into an SM-DP+.

10. The mobile network system of claim 1, wherein the subscription manager data preparation server is integrated into an SM-DP.

11. A method for provisioning mobile data services for one or more mobile devices that employ a secure element using a subscription manager data preparation server, the method comprising:

maintaining, at the subscription manager data preparation server a list of protected profiles, wherein the protected profiles are associated with one or more credentials of a mobile network operator of a mobile network;

when the secure element is outside a distance-based communication range of the mobile network, receiving, at the subscription manager data preparation server, a data service request associated with the secure element, the data service request specifying a first timeframe for when the secure element is expected to be within the distance-based communication range of the mobile network;

identifying, at the subscription manager data preparation server, a first available protected profile in the maintained list of protected profiles using the first timeframe specified in the received data service request;

creating, at the subscription manager data preparation server, a bound profile by associating the identified first protected profile with the received data service request and a unique identifier associated with the secure element;

receiving, at the subscription manager data preparation server, a second data service request associated with a second secure element, the second data service request specifying a second timeframe for when the second secure element is expected to be within the distance-based communication range of the mobile network;

identifying, at the subscription manager data preparation server, a second available protected profile in the maintained list of protected profiles using the second timeframe specified in the received second data service request; and creating, at the subscription manager data preparation server, a second bound profile by associating the identified second protected profile with the second received data service request and a second unique identifier associated with the second secure element, wherein the second protected profile is the same as the first protected profile and the first timeframe and second timeframe do not overlap.

12. The method of claim 11, wherein the method further comprises:

identifying, at the subscription manager data preparation server, a second bound profile that is due for service by using a data service request associated with the second bound profile; and activating service for the second bound profile due for service by communicating with the mobile network operator via the subscription manager data preparation server.

13. The method of claim 11, wherein the method further comprises:

identifying, at the subscription manager data preparation server, a second bound profile with expired service by using a data service request associated with the second bound profile;

de-activating service for the second bound profile with expired service by communicating with the mobile network operator via the subscription manager data preparation server; and de-associating, at the subscription manager data preparation server, the associated data service request and the second bound profile with expired service.

14. The method of claim 13, wherein the method further comprises:

notifying a user of the second bound profile with expired service; and downloading an invalid subscriber identity module (SIM) profile to the secure element associated, via the unique identifier, with the second bound profile with expired service.

15. The method of claim 11, wherein the secure element is an embedded Universal Integrated Circuit Card.

16. The method of claim 11, wherein the secure element is an integrated Universal Integrated Circuit Card.

17. The method of claim 11, wherein the subscription manager data preparation server comprises a service provider server in communication with an SM-DP+.

18. The method of claim 11, wherein the subscription manager data preparation server comprises a service provider server in communication with an SM-DP.

19. The method of claim 11, wherein the subscription manager data preparation server is integrated into an SM-DP+.

20. The method of claim 11, wherein the subscription manager data preparation server is integrated into an SM-DP.

* * * * *